United States Patent [19]
Berke et al.

[11] Patent Number: 5,556,460
[45] Date of Patent: Sep. 17, 1996

[54] DRYING SHRINKAGE CEMENT ADMIXTURE

[75] Inventors: Neal S. Berke, Chelmsford, Mass.; Michael P. Dallaire, Dover, N.H.; Ellis M. Gartner, Silver Spring; Awdhoot V. Kerkar, Columbia, both of Md.; Timothy J. Martin, West Sussex, England

[73] Assignee: W.R. Grace & Co.-Conn., New York, N.Y.

[21] Appl. No.: 529,389

[22] Filed: Sep. 18, 1995

[51] Int. Cl.$^6$ .................. C09D 7/12; C08L 71/02
[52] U.S. Cl. .................. 106/823; 106/724; 106/729; 106/730; 106/802; 106/804; 106/805; 524/5; 524/27; 524/35; 524/44; 524/47; 524/55; 524/56; 524/58; 524/577; 524/386; 524/387
[58] Field of Search .................. 106/724, 729, 106/730, 802, 804, 805, 823; 524/5, 27, 35, 44, 47, 55, 56, 58, 777, 396, 387

[56] References Cited

U.S. PATENT DOCUMENTS

| | | | |
|---|---|---|---|
| 3,486,916 | 12/1969 | Cordon | 106/802 |
| 3,583,880 | 6/1971 | Moren | 427/314 |
| 3,709,707 | 1/1973 | Rehmar | 106/842 |
| 4,141,737 | 2/1979 | Moon | 106/12 |
| 4,302,251 | 11/1981 | Udagawa | 106/708 |
| 4,547,223 | 10/1985 | Goōto | 106/802 |
| 4,946,904 | 8/1990 | Akimoto | 525/327.8 |
| 4,975,121 | 12/1990 | Sakuta | 106/724 |
| 5,016,711 | 5/1991 | Cowan | 166/250 |
| 5,020,598 | 6/1991 | Cowan | 166/293 |
| 5,142,036 | 8/1992 | Akimoto et al. | 106/823 |
| 5,174,820 | 12/1992 | Sakuta | 106/724 |
| 5,181,961 | 1/1993 | Umaki | 106/724 |
| 5,413,634 | 5/1995 | Shàwl | 106/696 |

FOREIGN PATENT DOCUMENTS

| | | |
|---|---|---|
| 88115639.2 | 3/1989 | European Pat. Off. . |
| 94306623.3 | 3/1995 | European Pat. Off. . |
| 4676310 | 6/1973 | Japan . |
| 54-110903 | 8/1979 | Japan . |
| 55-027819 | 2/1980 | Japan . |
| 56-00786 | 6/1981 | Japan . |
| 57-145054 | 9/1982 | Japan . |
| 5860293 | 4/1983 | Japan . |
| 57-129880 | 2/1984 | Japan . |
| 59-128240 | 7/1984 | Japan . |
| 59-128242 | 7/1984 | Japan . |
| 59-128251 | 7/1984 | Japan . |
| 59-131552 | 7/1984 | Japan . |
| 59-137383 | 8/1984 | Japan . |
| 1145357 | 6/1989 | Japan . |
| 251461 | 2/1990 | Japan . |

OTHER PUBLICATIONS

CA 124:125141, "Process and admixtures for rapidly altering" . . . , Franz et al. Apr. 95.

*Primary Examiner*—David Brunsman
*Attorney, Agent, or Firm*—Howard J. Troffkin

[57] ABSTRACT

A cement admixture composed of a low molecular weight oxyalkylene compound and a comb polymer having carboxylic acid groups and oxyalkylene units therein.

11 Claims, No Drawings ns. Specifically, the present invention is directed to a cement admixture composition capable of causing the combined effects of enhanced inhibition of drying shrinkage of cement compositions while providing desired compressive strength of the fully set composition. The present invention further provides an improved concrete composition structural product.

DRYING SHRINKAGE CEMENT ADMIXTURE

BACKGROUND OF THE INVENTION

The present invention is directed to a cement admixture composition capable of causing the combined effects of enhanced inhibition of drying shrinkage of cement compositions while providing desired compressive strength of the fully set composition. The present invention further provides an improved concrete composition structural product.

Specifically, the present invention is directed to a cement admixture composed of a synergistic combination of at least one low molecular weight oxyalkylene polyol or ether adducts of polyols with at least one high molecular weight comb polymer having a plurality of polyoxyalkylene chains and carboxylic acid groups, as fully described hereinbelow.

Hydraulic cement compositions, such as mortar (cement, small particulate, e.g. sand, and water), or concrete (cement, small particulate, large particulate, e.g. gravel, and water), have certain properties which substantially effect their durability. These properties include shrinkage which normally occurs during curing and drying of the cement composition. In addition, mortars and, in particular, concrete composition are used for structural applications where enhanced strength of the cured structural member is highly desired.

The term "drying shrinkage" shall refer herein and in the appended claims to mean drying shrinkage and/or curing shrinkage done via ambient conditions or under sealed conditions.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air, water and corrosive materials such as chloride and sulfate, to penetrate into the concrete structure, promoting carbonation of the cement and corrosion of the metal reinforcing bars contained therein. Further, the cracks provide a means for water to seep into and through the structure. Such water entry further deteriorates the structure through freeze–thaw cycling pressures exerted on the cement structure over its life. It is highly desired to provide a cement which exhibits high strength and is not subject to deterioration effects due to shrinkage and freeze–thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate it.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloaklyl radical, A may be $C_{2-3}$ alkylene radicals and n is 1–10, as shrinkage reducing additives for cement. Similarly, U.S. Pat. No. 5,147,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, alicyclic or aromatic group terminated oxyethylene and/or oxypropylene repeating chain compounds.

One of the main advantages of using cement compositions, such as mortar and concrete, to form architectural structural members is their ability to be cast into a desired form which is capable of exhibiting high compressive strength. With this in mind, the artisan does not desire to utilize admixtures or other ingredients which cause a decrease in such strength.

Alkylene glycols and glycerols have been used in combination with cement compositions for particular purposes. For example, these materials have been added to inhibit water crystal formation when casting in cold climate conditions or to inhibit the rate of evaporation of water in cement slurries used in high temperature well bore hole applications. Further, these additives have been used to provide a layer above cast, unset cement composition to inhibit evaporation of water at the surface portion of the structure and thereby enhancing the hydration of the cement at that portion of the formation.

The above compounds when made part of an unset composition additives cause the resultant cured composition to exhibit lower compressive strength than its untreated counterpart. When the cement composition is a mortar or, in particular, a concrete which is used to provide architectural structural members for buildings, parking garages, bridge decks and the like, it is essential that the mortar or concrete member exhibit high compressive strength. Therefore, shrinkage reducing additives which decrease the strength of the cured product have not found favor even though they inhibit cracking in the member as discussed above.

It is highly desired to provide a cement admixture which can further reduce the drying shrinkage attainable by the sole use of a glycol or glycol adduct shrinkage reducing agent.

Further, it is highly desired to provide a cement admixture which is capable of inhibiting drying shrinkage of structural cement compositions while enhancing the compressive strength of the resultant cured structure.

Still further, it is highly desired to provide a cement admixture which can form a neat composition which is capable of inhibiting drying shrinkage of structural cement compositions while enhancing the compressive strength of the resultant cured structure.

SUMMARY OF THE INVENTION

The present invention is directed to a cement admixture, and a method of forming an improved structural hydraulic cement formation, which causes further inhibiting of drying shrinkage attainable by the shrinkage agent used while also causing enhanced compressive strength to the treated formation. The admixture comprises a synergistic mixture of a low molecular weight oxyalkylene glycol or ether adducts thereof with a high molecular weight comb polymer having polyoxyalkylene chains and carboxylic acid units as part of the comb structure.

DETAILED DESCRIPTION

It has been unexpectedly found that when one combines a low molecular weight oxyalkylene compound, as described below, with a high molecular weight comb polymer having polyoxyalkylene chains, one attains a cement admixture composition which further inhibits drying shrinkage while imparting desired compressive strength to a treated cement composition structure.

Further, the present admixture has been found to provide the high inhibition of drying shrinkage and desired compressive strength for structural formation without suppressing the air entrainment capabilities of the treated composition.

The subject cement admixture requires the use of a low molecular weight oxyalkylene compound which can be selected from (i) an alkylene or oxyalkylene glycol or (ii) oxyalkylene ether adducts of alcohols, or polyols.

The molecular weight of these compounds may be up to about 4000 preferably up to about 2000. The glycol can be represented by the formula HOAOH or HO(AO)$_n$H (Formula I) where A represents a $C_2$–$C_{10}$ alkylene group such as ethylene, propylene, butylene and the like and mixtures thereof with ethylene and propylene being preferred; O represents an oxygen atom and n is an integer from 1 to about 80. The AO groups in a particular glycol molecule may all be the same or may be different. Examples of such glycols include 1,5-pentanediol, diethylene glycol, dipropylene glycol, tripropylene glycol, di(ethoxy)di(propoxy) glycol and the like. Further such glycols may include polyalkylene glycols, poly(oxyalkylene)glycol, having molecular weights up to about 1200, preferably up to about 1000. The AO groups forming the chain of such glycols may contain a single type of alkylene ether group or a mixture of alkylene ether groups which may be in block or random arrangement.

The oxyalkylene compounds used in forming the present admixture can also be oxyalkylene ether adducts of mono alcohols or polyols. The oxyalkylene adduct of monoalcohols is represented by the formula RO(AO)$_m$H (Formula IIA) wherein R is hydrocarbon group, such as a $C_1$–$C_7$ alkyl or a $C_5$–$C_6$ cycloalkyl, preferable a $C_3$–$C_5$ alkyl group. Examples of such R groups are methyl, ethyl, propyl, isopropyl, n-butyl, isobutyl, t-butyl, n-pentyl, isopentyl, cyclopentyl, cyclohexyl and the like. The preferred R groups are $C_3$–$C_5$ alkyl such as n-propyl, isopropyl, n-butyl, t-butyl and the like. Where there are more than one R group of a polyol of Formula IIA it is preferred that the R groups are the same. A is a $C_2$–$C_4$ (preferably $C_2$–$C_3$) alkylene group, such as ethylene, propylene and the like and mixtures thereof in the same chain, and m is an integer of from 1 to about 10.

The oxyalkylene adduct of polyols are represented by the formula Q[(OA)$_p$-OR']$_x$, (Formula II B), wherein Q represents a $C_3$–$C_{12}$ aliphatic hydrocarbon residual group of a polyhydroxyalkane, R' independently represents a hydrogen atom or a $C_1$–$C_{14}$ alkyl or cycloalkyl group with the proviso that at least one R' group represents a $C_1$–$C_{14}$ alkyl or cycloalkyl group, A represents a $C_2$–$C_4$ alkylene group or mixtures thereof, O represents oxygen atom, p represents an integer of from 0 to 10 and x represents an integer of 3 to 5.

Illustrative agents of Formula II B employed according to the present invention are derived from $C_3$–$C_{12}$ aliphatic triols, such as glycerol, 1,2,4-butanetriol, 2,3,4-pentanetriol, 2-ethyl-2-(hydroxymethyl)-1, 3-butanetriol, 2,,4-pentanetriol, 2-ethyl-2-(hydroxymethyl)-1, 3-propanetriol (trimethylol propane), 1,1,1-tris(hydroxymethyl)ethane, 1,2,6-trihydroxyhexane, 1,2,3-heptanetriol, and the like, $C_4$–$C_{12}$ aliphatic tetrols (e.g. 2,3,4,5-hexanetetrol, sorbitan, erythritol, pentaerythritol), $C_5$–$C_6$ sugar alcohols (including those compounds corresponding to the formula HOCH$_2$(CHOH)$_n$CH$_2$OH wherein n is 3 to 6 such as xylitol, sorbitol, arabitol, mannitol, and the like), monosaccharides (e.g. erythrose, threose, ribose, arabinose, xylose, lyxose, allose, altrose, glucose, mannose, gulose, idose, galactose, fructose, galactose, and the like), disaccharides (e.g. sucrose, lactose, maltose) and alkyl glycosides (e.g. methyl glycosides, ethyl glycosides, propyl glycosides, and other glycoside molecules wherein the alkyl glycoside is an acetal formed by interaction of a $C_1$–$C_{20}$ alcohol with a carbonyl group of a mono- or a disaccharide such as glucose). Also suitable for use as the polyol are polysaccharides such as cellulose, hydroxycellulose, chitin, guar, and starches as well as hydroxy-containing substances such as tetrahydrofuran oligomer, oxetane oligomers, sorbitol oligomers, glycerol oligomers, and the like.

Where there are more than one alkyl group represented by R' above, preferably the R's are the same alkyl group. Illustratively, R' is methyl, ethyl, propyl, isopropyl, n-butyl, isobutyl, t-butyl, amyl, t-amyl, hexyl, heptyl, octyl, 2,4,4-trimethylpentyl, nonyl, decyl and the like. R' is preferably a $C_4$–$C_5$ tertiary alkyl group.

The preferred polyol components have the formula

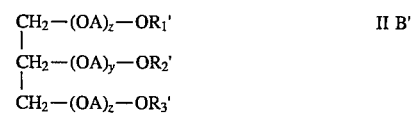

where $R_1$, $R_2$ and $R_3$ are each hydrogen or a $C_1$–$C_{14}$ alkyl group with the proviso that at least one of R'$_1$, R'$_2$ or R'$_3$ is a $C_1$–$C_{14}$ alkyl group, A is a $C_2$–$C_4$ alkylene group and x, y and z are each selected from an integer from 0–10. Preferably $R_1$ and $R_3$ are the same alkyl group, such as methyl, ethyl, propyl, isopropyl, n-butyl, isobutyl, t-butyl, amyl, t-amyl, hexyl, heptyl, octyl, nonyl, decyl and the like. Most preferably, $R_1$ and $R_3$ are the same $C_4$–$C_5$ tertiary alkyl group. Mixtures can be employed including mixtures of additives with different alkyl groups and/or different oxyalkylene groups; mixtures of 1,2 diether, 1,3 diether and 1,2,3 triether are preferred.

The preferred compounds of Formula II B' are those having R' representing a butyl group, A representing an ethylene or propylene and each x and z is 2 or 3. The most preferred adduct is dipropylene glycol mono-t-butyl ether and tripropylene glycol mono-t-butyl ether.

In the case of the derivatives of glycerin, preferred components of the subject admixture are those having the following formula:

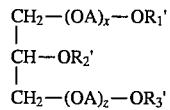

wherein $R_1$ and $R_3$ are $C_1$–$C_{16}$ alkyl groups, preferably t-butyl or t-amyl groups, $R_2$ is hydrogen, x and z are each 4–10 and A is propylene. The preparation of such materials is shown, for example, in U.S. Pat. Nos. 2,932,670, 2,932,616 and 4,241,224.

The present invention further requires a high molecular weight comb polymer wherein the pendant chains of the polymer have a plurality of oxyalkylene or carboxylic acid groups and said oxyalkylene groups provide a major component of the polymer.

The term comb polymer shall mean herein and in the appended claims copolymers having (i) carboxylic acid anhydride, free carboxylic acid or its ammonium, alkali or alkaline earth metal salt of carboxylic acid units and (ii) $C_2$–$C_5$ oxyalkylene units therein and wherein the carboxylic acid units or oxyalkylene units are pendant to the polymer backbone structure and wherein the oxyalkylene units provide a majority of the molecular weight of the comb polymer.

The polymer may have units which can be generally represented by the formula

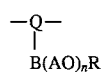    III wherein Q is a fragment of the polymer backbone chain such as a hydrocarbon fragment of a residual of an ethylenic group which has a pendant group represented by $B(AO)_nR$; B represents a tying group which covalently bonds the $(AO)_nR'$ group to the hydrocarbon polymer backbone chain, said tying group B may be selected from carboxylic acid ester group (—COO—), carboxylic acid amide group (—C(O)NH—), alkenyl ether (—$C_xH_{2x}$O—, where x is 1–10), ether oxygen (—O—) or where vicinal pendant groups provide carboxylic acid imide group [(—C(O))$_2$N]; A is a $C_2$–$C_{10}$ alkylene group or mixtures thereof, preferably a $C_2$–$C_4$ alkylene group or mixtures thereof; O represents oxygen atom; R represents a hydrogen atom or a $C_1$–$C_{10}$ hydrocarbon (alkyl, aryl alkaryl or the like) group; n has a value of from about 25 to 100 and sufficient to have the AO groups provide a majority of the molecular weight of the polymer.

In addition to the polymer units represented by Formula III above, the polymer hydrocarbon backbone chain may contain free carboxylic acid anhydride, the free carboxylic acid or its salt pendant groups.

The polymer may be a homopolymer or a copolymer with other copolymerizable units. The copolymerizable monomeric units may be randomly distributed in the polymer structure or may be alternating with the above structure I. Further, the copolymer may contain either one or more than one type of structure III units within the polymer structure and the units may be random or block configuration. Further, the AO chains of any polymer may be made up of a single oxyalkylene group, such as oxyethylene, oxypropylene or the like or mixtures of said groups and said mixture of AO groups may be in block or random configuration.

The molecular weight of the comb polymers found useful in the subject admixture composition have a weight average molecular weight of from about 2,000 to 100,000, preferably from about 2,000 to 50,000 and most preferably from about 2,000 to 25,000. Further, at least about 50, preferably at least 60 percent by weight of the polymers molecular weight should be attributable to the molecular weight of the AO units therein.

Examples of polymers found useful in the present invention have been disclosed in U.S. Pat. Nos. 4,946,904; 5,142,036; 5,362,323; 5,393,343; 4,471,100 and 5,369,198 the teachings of which are incorporated herein by reference. U.S. Pat. Nos. 4,946,904 and 5,362,323 disclose maleic anhydride/alkenyl ether comb polymers and their hydrolyzed product in which the oxyalkylene groups are linked to the backbone polymer chain by an alkenyl ether group. U.S. Pat. No. 5,142,036 discloses a maleic anhydride/alkenyl ether copolymer which further has oxyalkylene groups linked by maleic ester groups. U.S. Pat. No. 5,393,343 discloses polyacrylic acid amide/imide polymers wherein the oxyalkylene chain is linked to the backbone polymer chain by amide groups and vicinal carboxylic acid units which form imide groups. This polymer may further contain unreacted carboxylic acid groups or salts thereof. U.S. Pat. Nos. 4,471,100 and 5,369,198 disclose copolymers which link the oxyalkylene group to the backbone polymer chain by carboxylic acid ester groups.

It is understood that when an oxyalkylene chain is pendant through a carboxylic acid anhydride (e.g. maleic acid unit) or free carboxylic acid (e.g. acrylic acid unit), all acid units may not be utilized in such linkage and remain as acid units.

Alternately, the comb polymer of the present invention may be a copolymer having a poly(oxyalkylene) backbone which have carboxylic acid containing units grafted to the backbone polymer chain. The grafting is normally accomplished by free-radical initiated grafting of ethylenically unsaturated monomers having carboxylic acid groups therein. It is believed, though not meant to be a limitation to the present invention that the grafting occurs through a secondary carbon atom on the backbone (one having only one carbon—hydrogen bond). The ethylenically unsaturated carboxylic acid containing monomer may be, for example, acrylic acid, methacrylic acid, itaconic acid and the like as well as their $C_1$–$C_3$ alkyl esters. When the poly(oxyalkylene) polymer has hydroxy termination groups, a small degree of esterification between the hydroxyl and carbonyl group may also be present and additional carboxylic acid units be pendant therefrom. Comb polymers of this type are described in U.S. Pat. No. 4,814,014, the teaching of which is incorporated herein by reference.

The polymers of the instant invention may differ from that disclosed in the cited references or elsewhere as the polymers presently required must have oxyalkylene units forming the major component (at least 50 wt. percent) by weight of the polymer. Further the present polymer may contain other copolymerizable units provided the above requirement is met. For example, the copolymer may further have styrene, methyl vinyl ether, vinyl pyrrolidone and the like units as part of the polymer structure.

Various materials have been used to enhance the fluidity of cement compositions. Such materials are generally referred to as cement plasticizers or superplasticizers for cement compositions and include, for example, condensation products of naphthalenesulfonate-formaldehyde, condensation products of melamine sulfonate formaldehyde, lignon, polyacrylates as well as oxyalkylene derivatives described hereinabove. However, it has been found that most common cement plasticizers and superplasticizers, when added to low molecular weight oxyalkylene drying shrinkage inhibitor agents do not cause a further enhancement of the drying shrinkage activity of the shrinkage agent and, further, may not overcome the suppression of compressive strength observed when cement compositions are treated with such agents. It has been unexpectedly found that the present combination provides the desired effect of enhancing the inhibiting drying shrinkage over that attained by the subject low molecular weight shrinkage reducing agent while providing desirable compressive strength to cement compositions, in particular to architectural structural concrete compositions.

The subject cement admixture composition should contain component A to component B in a weight ratio of from about 1 to 100 and preferably from 3 to 20. The admixture may be neat or be composed of an aqueous solution of the required combination. It has been unexpectedly found that the required components A and B are substantially miscible in one another and can provide a storage stable composition with very small amounts (e.g. 10 weight percent) water. Thus, the present composition does not require the addition, transportation and storage of large amounts of water. Aqueous solutions preferably contain the combination of components in from 10 to 50 weight percent although greater or lesser concentrations may be suitable in certain instances.

The admixture composition of the present invention may be used with hydraulic cements suitable for architectural structural application, such as ordinary, quick-hardening and moderate-heat portland cements, high alumina cements, blast-furnace slag cement and the like. Of these, portland cements of the ordinary and quick-hardening types ae particularly desired and most readily used to form architectural structural members.

The active components of the cement admixture of the present invention should be present in from about 0.1 to about 3, preferably about 0.5 to about 3 and most preferably from about 1 to about 2 weight percent based on the weight of cement content of the cement composition being treated. The quantity of water used for setting the cement composition can vary within the weight ratios of water to cement of from about 0.2:1 to 0.6:1, preferably 0.3:1 to 0.5:1. Aggregate, such as pebble, gravel, sand, pumice or fired perlite, as required may be employed in conventional amounts.

The improved cement of the present invention is composed of a substantially uniform mixture of a hydraulic cement and the subject cement admixture composed of at least one component A with at least one component B which are described above. The improved cement may be formed at any stage of the cement's formation or use, such as by applying the admixture to cement powder during the grinding or blending with other dry materials to prepare a specific type of cement. Although small amounts of water may be present during the blending, the amount of water will be insufficient to cause substantial hydration of the cement.

Alternately, an improved cement composition can be formed in situ during the course of preparing a cement composition such as a mortar mix or a concrete. The components of the admixture composition can be added together as a single composition or they can be added separately as separate material or as part of the water of hydration. When the admixture is in the form of an aqueous solution, the water content of the solution should be calculated as part of the total water content of the cement composition.

Various conventional ingredients may be optionally used. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; reinforcing-steel corrosion inhibitors such as a sodium nitrate and calcium nitrite; water-reducing agents, amines and their derivatives, alkanolamines, and inorganic salts such as borates, phosphates, chlorides and nitrates; and the like. The quantity of such an optional ingredient or ingredients is usually 0.05–6% by weight of the cement.

The addition of the cement admixture composition of the present invention to a cement will markedly reduce the drying shrinkage of the resulting cement composition (e.g. mortar and concrete) above that achievable by the use of the low molecular weight compound and will exhibit desired compressive strength compared with that of untreated composition or relative to cement composition having only one of the components of the present admixture.

The following examples are given for illustrative purposes only and are not meant to be a limitation on the invention, as defined by the claims appended hereto. All parts and percentages are by weight unless otherwise indicated. The term "S/S" indicates solid additive based on solid weight of cement in the treated composition.

EXAMPLE 1

A series of micro concrete samples were made according to the following procedure: 1800 parts of Type I Portland cement from three different suppliers (Labeled "A", "B" and "C") were each blended with a mixture of the following ASTM graded sands: 1069 parts of F-95 sand, 972 parts of C-109; 972 parts of C-185, and 1847 parts of 15-S sand. The dry blending was done in a Hobart mixer for approximately 0.5 minutes. The aggregate to cement ratio was 2.7. To each of the blends was added 900 parts of deionized water (w/c=0.5 for blank). The blends were thoroughly mixed in the Hobart mixer for approximately nine (9) additional minutes to form the micro-concrete reference materials.

The air content of the resulting micro concretes were measured using-ASTM C-185 test method. The slump of each of the concretes was measured using the ASTM C-143 test method. The micro concretes were then poured into stainless steel prism molds (1"×1"×12") following ASTM C-490 test procedure. The mixes were cured for 24 hours at 100% RH and 20° C. The prisms were demolded and stored in environmental chamber maintained at 50% RH and 20° C. The length of the prisms was measured periodically using a length comparator following the ASTM test procedure. Table 1 summarizes the data of % shrinkage reduction observed in presence of MPD and MPD in combination with copolymer M-1511 in comparison to the blank. The data indicate that combination of MPD with copolymer M-1511 does not compromise the shrinkage reduction inhibition performance of MPD.

TABLE 1

| Cement Type | Dosage DIOL | (%) | Copolymer | Dosage (%) | W/C Ratio | Slump (cm) | Air (%) | Set-Time (min) | Strength (% 1 Day) | (% 7 Day) | (% 28 Day) | Shrinkage Reduction |
|---|---|---|---|---|---|---|---|---|---|---|---|---|
| B | None | — | None | — | 0.50 | 8.4 | 3.2 | 245 | 100 | 100 | 100 | 0% |
|   | None | — | M-1511 | 0.10 | 0.42 | 8.5 | 8.2 | 298 | 150 | 115 | 103 | 3% |
|   | MPD | 1.0 | None | — | 0.48 | 8.1 | 5.3 | 295 | 78 | 98 | 97 | 17% |
|   | MPD | 1.0 | M-1511 | 0.10 | 0.41 | 9.6 | 8.3 | 346 | 130 | 139 | 113 | 27% |
|   | MPD | 2.0 | None | — | 0.47 | 8.6 | 5.8 | 297 | 64 | 89 | 82 | 32% |
|   | MPD | 2.0 | M-1511 | 0.10 | 0.40 | 9.6 | 7.3 | — | 85 | 117 | 101 | 45% |

EXAMPLE 2

Concrete samples were formed using a mix design proportioned by a volumetric method according to ACI guidelines. The design requirements were based on 517 parts Type I Portland cement, 1140 parts West Sand fine sand, 740 parts Wrentham 0.75 inch coarse aggregate, 370 parts 1 inch Au Claire gravel, 370 parts 0.625 inch Au Claire gravel and 370 parts 0.375 inch and 263 parts water. The fine aggregate was adjusted to project design parameters of 5.5% air content, 0.51 water to cement ratio and a slump of about 3.5 inches.

The concrete was formed according to ASTM C-192 specifications. The water, coarse aggregate, fine aggregate and the appropriate admixture were initially charged into a concrete mixer and mixed for one minute. The Portland cement was then added and mixing continued for an additional three minutes followed by a three minute rest period and a final two minutes of mixing. The resultant samples were tested according to ASTM C-143 for slump, ASTM C-138 for weight and yield, ASTM C-231 for air content of the freshly mixed samples, ASTM C-192 for compressive strength and ASTM C-157 for length change.

Mixtures were designed for constant workability modifying the amount of water and sand.

The results of the tests are shown in Table 2. Sample 1 is a reference untreated sample. Sample 2 contained only low molecular weight t-butyl dipropylene glycol and dipropylene glycol in 2:1 ratio. Sample 3 contained the same additives as Sample 2 with a polyoxyethylene-oxypropylene glycol, (MW=5000) grafted with acrylic acid side chains of about 2 units. Sample 4 contained the same additives as Sample 2 with a polyacrylic acid having oxyethylene ester and amide side chains on about 70 percent of the acrylic acid and further having a small amount of tall oil fatty acid as air entrainer.

TABLE 2

| Sample | Admixture | Slump (in.) | Air (%) | Compressive Strength PSI 28 days | % Shrinkage Reduction (56 days)* |
|---|---|---|---|---|---|
| 1 | — | 3.75 | 5.3 | 5755 | — |
| 2 | DPGBE (1) PPG (0.5) | 3.25 | 5.6 | 5940 | 32% |
| 3 | DPGBE (0.88) PPG (0.44) EoPoly (0.18) | 3.5 | 5.7 | 6600 | 55% |
| 4 | DPGBE (1.25) PAA/AO (0.17) | 3.5 | 5.6 | 6540 | 63% |

EXAMPLE 3

Concrete was formed in the same manner as Example 2 except that the design was 658 parts Type I cement, 1750 parts 0.75 in coarse aggregate, 1230 parts West sand and 263 parts water. The design was for 6% air, water to cement ratio of 0.40, and slump of 6–7 inch obtained by use of naphthalene sulfonate superplasticizer.

The results are shown in Table 3.

TABLE 3

| Sample | Admixture | Slump | W/C | Plastic Air (%) | Compressive Strength PSI 28 days | % Shrinkage Reduction |
|---|---|---|---|---|---|---|
| 1 | — | 6.75 | 0.40 | 5.5 | 5755 | — |
| 2 | DPGBE (1.2) DPG (0.3) P(EO)AA (0.2) | 4.75 | 0.38 | 5.0 | 6540 | 95% |

P(EO)AA = polyoxyethylene oxypropylene glycol grafted with acrylic acid

What is claimed:

1. A cement admixture capable of enhancing inhibition of drying shrinkage comprising a mixture of:
   A) at least one oxyalkylene glycol, oxyalkylene ether glycol or mixtures thereof having a molecular weight of up to about 4000; and
   B) a comb polymer of a molecular weight of from 2,000 to 100,000 having (i) carboxylic acid anhydride, free carboxylic acid or its ammonium, alkali or alkaline earth metal salt and (ii) $C_2$–$C_5$ oxyalkylene units or mixtures of said units, wherein said units (i) or (ii) being pendant from the polymer backbone chain and said units (ii) provide the majority of the molecular weight of said polymer said component A and component B are in a weight ratio of 1:1 to 100:1.

2. The admixture of claim 1 wherein component A is at least one low molecular weight oxyalkylene compound selected from:
   i) oxyalkylene glycols represented by the formula HOAOH or HO(AO)$_n$H wherein A represents a $C_2$–$C_{10}$ alkylene group, O represents an oxygen atom, and n represents an integer of from 1 to about 80;
   ii) oxyalkylene adducts of monoalcohols represented by the formula RO(AO)$_m$H wherein R represents a $C_1$–$C_7$ alkyl or a $C_5$–$C_6$ cycloaklyl group, A represents a $C_2$–$C_4$ alkylene group, O represents an oxygen atom and m represents an integer of from 1 to about 10;
   iii) oxyalkylene adducts of polyols represented y the formula Q[(OA)$_p$OR']$_x$ wherein Q represents a $C_3$–$C_{12}$ aliphatic hydrocarbon residual group of a polyhydroxyalkane, each R' independently represents a $C_1$–$C_{14}$ alkyl or cycloalkyl group or hydrogen atom provided at least one R' of said adduct represents a $C_1$–$C_{14}$ alkyl or cycloalkyl group; A represents a $C_2$–$C_4$ alkylene group; O represents an oxygen atom; p represents an integer of from 0 to about 10; and x represents an integer of from 3 to 5; and
   iv) mixtures of said oxyalkylene compounds.

3. The admixture of claim 2 wherein said component A is at least one oxyalkylene glycol represented by the formula HO(AO)$_n$H.

4. The admixture of claim 2 wherein the component A is at least one oxyalkylene adduct of monoalcohols represented by the formula RO(AO)$_m$H.

5. The admixture of claim 2 wherein the component A is at least one oxyalkylene adduct of polyols represented by the formula Q[(OA)$_p$OR']$_x$.

6. The admixture of claim 2 wherein the component B is a comb polymer composed of a polymer having free carboxylic acid groups or alkali or alkaline earth metal salts thereof and having units represented by the formula

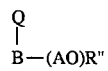

wherein Q is an ethylenic group

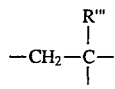

with R''' being hydrogen or $C_1$-$C_3$ alkyl; B represents a tying group which covalently bonds the $(AO)_nR'$ group to the hydrocarbon polymer backbone chain, said tying group B may be selected from carboxylic acid ester group (—COO—), carboxylic acid amide group (—C(O)NH—), alkenyl ether (—$C_xH_{2x}$O—, where x is 1–10), ether oxygen (—O—) or where vicinal pendant groups provide carboxylic acid imide group [(—C(O))$_2$N]; A is a $C_2$-$C_{10}$ alkylene group or mixtures thereof, preferably a $C_2$-$C_4$ alkylene group or mixtures thereof; O represents oxygen atom; R represents a hydrogen atom or a $C_1$-$C_{10}$ hydrocarbon (alkyl, aryl alkaryl or the like) group; n has a value of from about 25 to 100 and sufficient to have the AO groups provide a majority of the molecular weight of the polymer.

7. The admixture of claim 6 wherein the component B is a comb polymer composed of a maleic anhydride/alkenyl ether copolymer in about 1 to 1 maleic anhydride to ether molar ratio and said alkenyl ether is represented by the formula

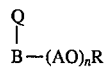

wherein Q represents —$CH_2$—CH—; B represents $C_xH_{2x}$O— wherein x is 1 to 10; A is $C_2$-$C_4$ alkylene; O is oxygenation; and R is hydrogen or a $C_1$-$C_{10}$ hydrocarbon group.

8. The admixture of claim 6 wherein the component B is a polyoxyalkylene glycol having ethylenically unsaturated carboxylic acid units grafted thereto.

9. The admixture of claim 1 wherein the component B is a comb polymer composed of a polymer having free carboxylic acid groups or alkali or alkaline earth metal salts thereof and having units represented by the formula

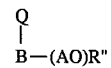

wherein Q is an ethylenic group

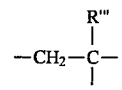

with R''' being hydrogen or $C_1$-$C_3$ alkyl; B represents a tying group which covalently bonds the $(AO)_nR'$ group to the hydrocarbon polymer backbone chain, said tying group B may be selected from carboxylic acid ester group (—COO—), carboxylic acid amide group (—C(O)NH—), alkenyl ether (—$C_xH_{2x}$O—, where x is 1–10), ether oxygen (—O—) or where vicinal pendant groups provide carboxylic acid imide group [(—C(O))$_2$N]; A is a $C_2$-$C_{10}$ alkylene group or mixtures thereof, preferably a $C_2$-$C_4$ alkylene group or mixtures thereof; O represents oxygen atom; R represents a hydrogen atom or a $C_1$-$C_{10}$ hydrocarbon (alkyl, aryl alkaryl or the like) group; n has a value of from about 25 to 100 and sufficient to have the AO groups provide a majority of the molecular weight of the polymer.

10. The admixture of claim 9 wherein the component B is a comb polymer composed of a maleic anhydride/alkenyl ether copolymer in about 1 to 1 maleic anhydride to ether molar ratio and said alkenyl ether is represented by the formula

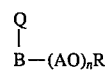

wherein Q represents —$CH_2$—CH—; B represents $C_xH_{2x}$O— wherein x is 1 to 10; A is $C_2$-$C_4$ alkylene; O is oxygenation; and R is hydrogen or a $C_1$-$C_{10}$ hydrocarbon group.

11. The admixture of claim 9 wherein the component B is a polyoxyalkylene glycol having ethylenically unsaturated carboxylic acid units grafted thereto.

* * * * *